United States Patent [19]
Zimmermann et al.

[11] Patent Number: 4,565,956
[45] Date of Patent: Jan. 21, 1986

[54] FAST-ACTING SERVO DRIVE SYSTEM

[75] Inventors: Peter Zimmermann, Dieburg, Fed. Rep. of Germany; John W. Teape, Cambridge, England

[73] Assignee: Robert Bosch GmbH, Stuttgart, Fed. Rep. of Germany

[21] Appl. No.: 658,466

[22] Filed: Oct. 9, 1984

Related U.S. Application Data

[63] Continuation of Ser. No. 357,623, Mar. 12, 1982, abandoned.

[30] Foreign Application Priority Data

May 23, 1981 [DE] Fed. Rep. of Germany ....... 3120559

[51] Int. Cl.$^4$ .............................................. H02P 5/28
[52] U.S. Cl. .................... 318/721; 318/722; 318/724; 318/715; 318/254
[58] Field of Search ................................ 318/721–724, 318/714, 715, 718, 805, 806, 800–803, 799, 798, 685, 696, 254 A, 254, 138

[56] References Cited

U.S. PATENT DOCUMENTS

| | | | |
|---|---|---|---|
| 3,243,677 | 3/1966 | Cannalte | 318/722 X |
| 4,024,444 | 5/1977 | Dewan | 318/805 |
| 4,230,976 | 10/1980 | Muller | 318/254 A X |
| 4,240,020 | 12/1980 | Okuyama | 318/722 X |
| 4,275,343 | 6/1981 | Fulton | 318/724 X |
| 4,329,636 | 5/1982 | Uchida | 318/723 X |
| 4,435,673 | 3/1984 | Hagino | 318/254 |

FOREIGN PATENT DOCUMENTS 2915987 2/1981 Fed. Rep. of Germany .

OTHER PUBLICATIONS

"Electric Machinery", Fitzgerald, A. E. and Charles Kingsley, Jr. New York: McGraw-Hill Book Co., Inc., (1952), pp. 124–125.
"Principles of Alternating Current Machinery", Ralph R. Lawrence, New York: McGraw-Hill Book Co., Inc., 3rd ed. (1940), pp. 20–23.
Zimmermann, P. and Robert Bosch, "Electronically Commutated D.C. Feed Drives for Machine Tools"; Geschaftsbereich Industrieausrustung 6120 Erbach, Germany; pp. 1–17.

Primary Examiner—William M. Shoop, Jr.
Assistant Examiner—Patrick C. Keane
Attorney, Agent, or Firm—Frishauf, Holtz, Goodman & Woodward

[57] ABSTRACT

To provide for fast response of a servo drive with a synchronous machine in which the same torque is available over the entire rotational range of the machine regardless of angular position of the rotor, phase currents to phase windings, preferably three-phase, are controlled in dependence on required torque, and steered to the respective phase windings by a rotor position transducer in such a manner that the sum of all the phase currents remains constant, and is connected to the respective phase windings, in pulses, during an electrical angular range when induced armature counter electromotive force voltages in the respective phase windings, which have an essentially trapezoidal shape, are in their flat or unvarying range within the voltage distribution during revolution of the rotor. Thus, currents are supplied to the phase windings only when the counter EMF voltages are essentially constant. A fullwave bridge-type current supply is suitable, using semiconductor switches, which are suitably controlled to steer currents to the respective phase windings, thus reducing commutating losses since only one of the semiconductor switches is switched ON or OFF, the remaining semiconductor switches functioning only as current steering elements.

12 Claims, 7 Drawing Figures

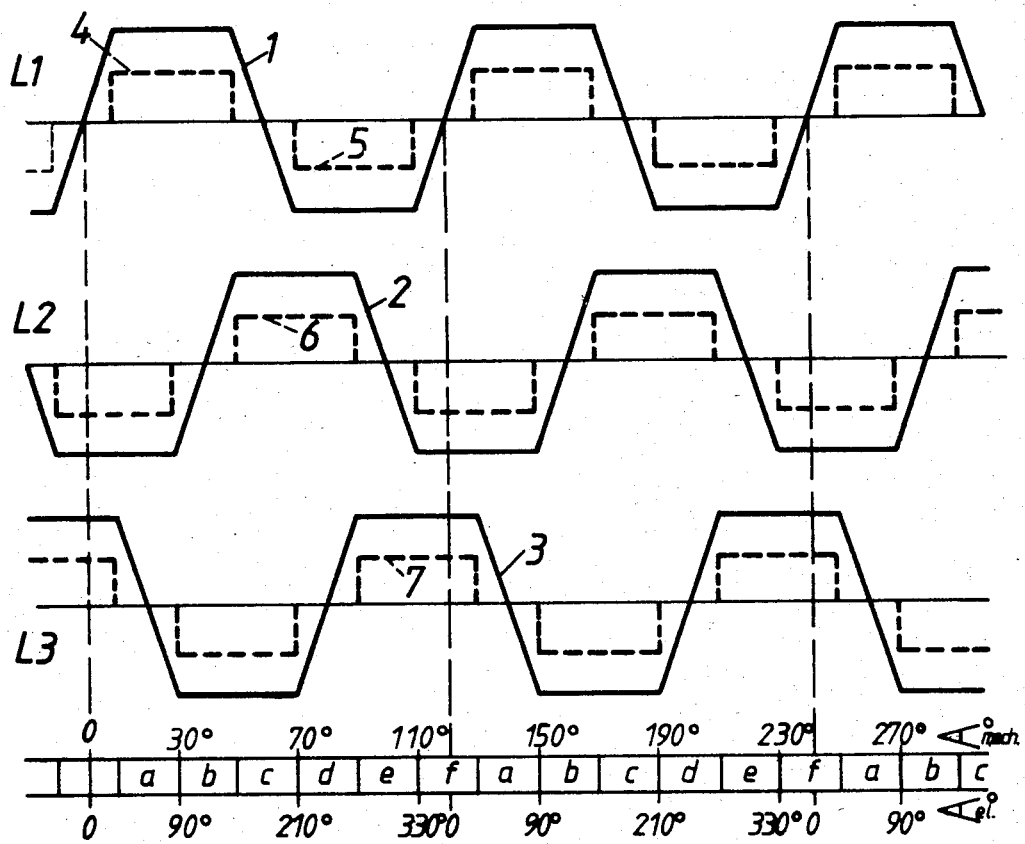
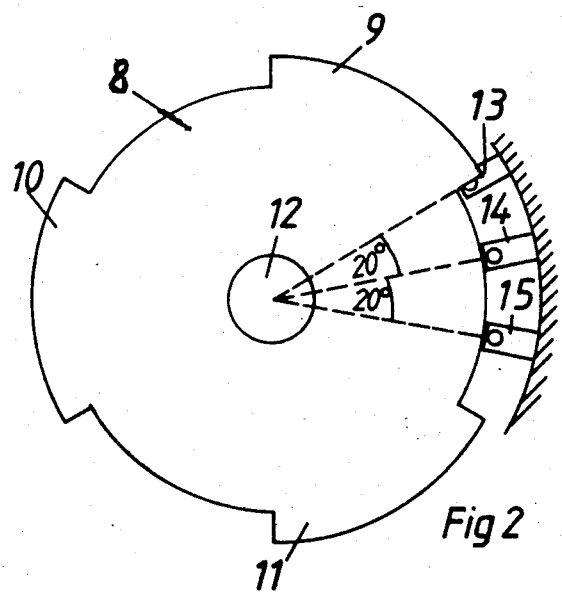
Fig 1
Fig 2
Fig 3

FAST-ACTING SERVO DRIVE SYSTEM

This application is a continuation of application Ser. No. 357,623, filed Mar. 12, 1982, now abandoned.

The present invention relates to a servo drive system, and more particularly to a servo drive unit having a servo motor which reacts rapidly to changes in control current and provides for accurate positioning.

BACKGROUND

Numerically controlled machine tools and other apparatus which have to be positioned, particularly when substantial positioning forces are needed, frequently use servo drives or servo motors. For rapid, accurate control, the motors should have a torque output which can be accurately and precisely controlled from lowest speed, in the limiting case from stopped condition, up to the highest maximum rated speed of the motor. The angular torque distribution as the motor operates, should be uniform, so that the circumferential instantaneous speed depends only on the control current. The motor should start from any random angular position after having been stopped.

Usually, d-c motors are used for such applications. Due to the necessary commutation, such motors have substantial disadvantages. It has been proposed to use self-controlled synchronous dynamo electric machines to avoid the disadvantages of d-c motors. Synchronous motors, however, require a positioning transducer which is expensive and introduces additional complexity in order to provide a digital positioning signal which is a precise analog of the position, and thus a high resolution signal.

THE INVENTION

It is an object to provide a servo motor which can be simply and easily controlled by simple power amplifiers, and which does not require complex structures, so that the servo motor can be built as a compact unit.

Briefly, a synchronous-type motor, preferably of the three-phase type, is provided, in which the currents through the phase windings are controlled by switching elements, for example semiconductor switches. The rotor field, typically, but not necessarily, a permanent magnet, and the armature windings are so relatively matched and positioned with respect to each other to provide, upon rotation of the rotor, essentially trapezoidally shaped induced counter electromotive force (CEMF) voltages in the armature phase windings. The switch control means controls switches such that the supplied currents to the phase windings are applied in pulses, under control of a rotor positioning element. The pulses are essentially square-wave pulses occurring within the flat or horizontal portion of the trapezoidally shaped CEMF voltage; and such that the sum of all the currents through the phase windings is essentially constant for any rotary or angular position of the rotor for any given required torque of the motor.

The system has the advantage that the servo drive is essentially self-controlled, and utilizes the easily constructed and compact synchronous type of dynamo electric machine, with a very simple positioning transducer. The efficiency of operation is high, and the power amplifiers which provide current to the phase windings of the dynamo electric machine are easily controlled. As an additional advantage, the positioning element, typically a wheel or disk which may be magnetized, or constructed in form of an optical transducer, can be readily combined with further electronic components for signal processing and positioned within the housing of the synchronous motor. It can be easily associated with a brushless tacho generator, and additionally provide output signals for commutating the output from the tacho generator.

DRAWINGS

FIG. 1 is a graph showing voltage and current diagrams in three phase windings of a three-phase synchronous motor;

FIG. 2 is a schematic top view of a positioning transducer disk;

FIG. 3 is a truth or signal table of signals derived from transducer elements associated with the disk of FIG. 2;

FIG. 7 is a schematic representation in conventional form of skewing the rotor magnetization with respect to the stator coils.

Figure 4:
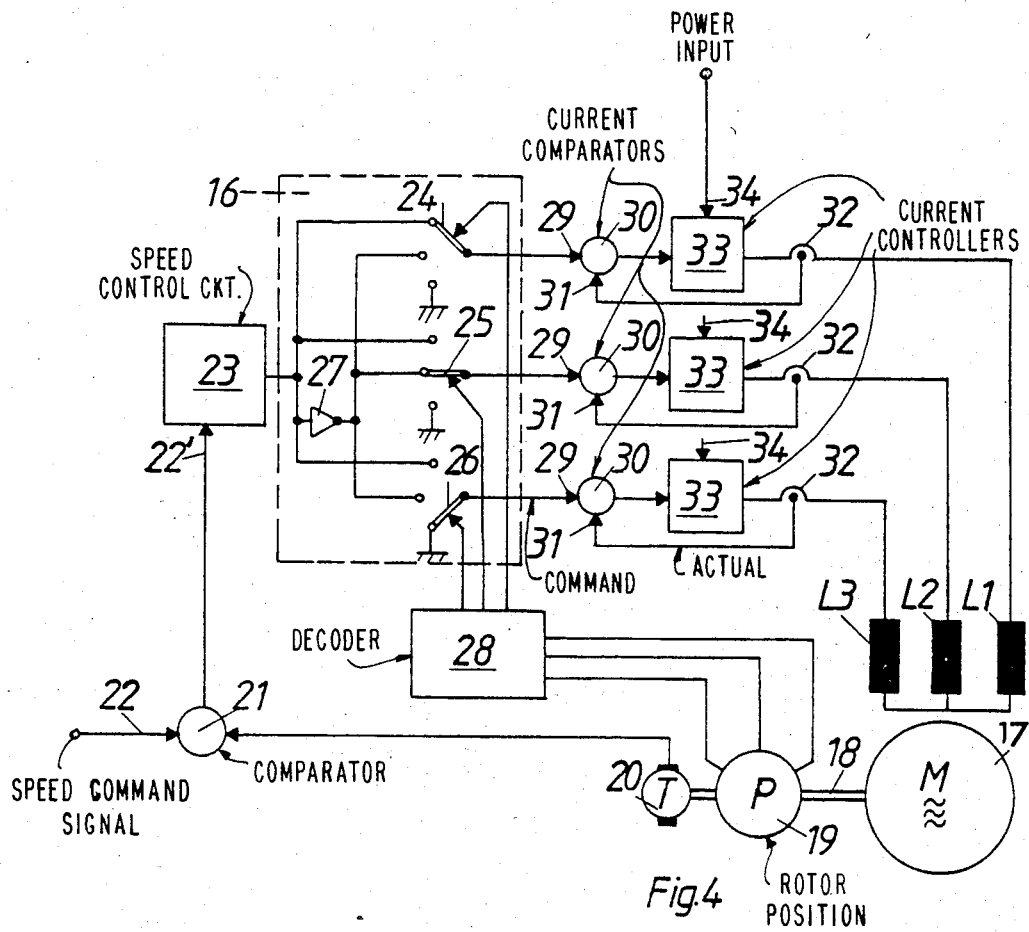
FIG. 4 is a schematic circuit diagram of the control system for a three-phase synchronous dynamo electric machine.

The voltages and currents induced in the armature winding, that is, the CEMF, upon rotation of a magnetized rotor are illustrated in FIG. 1 over half a revolution of the armature. The invention will be described in connection with a three-phase six-pole synchronous motor. By suitable construction of the synchronous motor, for example by utilizing a permanent magnet rotating field and skewing of the slots of the armature lamination stack, or utilizing inclined or skewed magnetized permanent magnets in the field (see FIG. 7) with a suitable pole coverage angle, trapeze-shaped or trapezoidal wave forms of induced EMF or voltages 1, 2, 3, will appear in the armature windings. Alternatively, the magnets or the field structure of the rotor can utilize magentic elements or electromagnetically generated magnets which are located at the circumference of the field in skewed or inclined position. Any other suitable way of relatively generating a magnetic field and positioning the armature windings can be used, the essential feature being to obtain an induced EMF which, has a wave shape which is essentially, trapezoidal as seen in the graphs 1, 2, 3 of FIG. 1. The trapezoidal shape is particularly pronounced if a single slot or groove winding is used having each a single groove per pole and phase. In the example selected, 18 slots are used with six poles and three phases. This results in particularly effective machine utilization and high efficiency. The trapeze-shaped voltage wave distribution 1 of the winding L1 has an essentially linear voltage rise from 0°-el to about 30°-el, that is, 10°-mechanical (mech). The voltage then remains even or constant up to 150°-el (50°-mech), and then drops linearly down to 210°-el (70°-mech) to a negative value which is the mirror image of the positive half-wave. It then remains constant at the negative value up to 330°-el (110°-mech), to then again rise linearly to the positive voltage as aforesaid, passing the zero or null line at 360°-el (120°-mech). This pattern repeats three times for each full revolution of the armature (360°-mech). Similar voltage curves 2, 3 occur in the phase windings L2 and L3, each with a phase shift of 120°-el (40°-mech).

A switching system—to be described in detail below—controls current flow through the armature phase winding to provide a predetermined controlled or command current in positive or negative direction. In accordance with the invention, the current flow is controlled to occur only during those angular ranges when the CEMF is constant or even. In the first quadrant, this may be the current shown in broken lines by curve 4, which in the phase winding L1 starts at 30°-el, remains constant to 150°-el, then terminates, and resumes at 210°-el in reverse direction to form current curve 5. It remains constant to 330°-el, terminates, and then starts again at 30°-el as before. Currents 6, 7 through the phase windings L2, L3 follow in a similar manner, with equal magnitude and direction, offset by 120°-el for each phase.

As can be clearly seen, current switching occurs after angular ranges of 60°-el (20°-mech), resulting in an angular range of 360°-el (120°-mech) in six angular ranges a to f, in which no current direction switching is required. The angular ranges a to f with similar switching pattern repeat in accordance with the number of poles three times for each full revolution of the armature. The sum current in all angular ranges will be the same which, in a star-connected armature winding, always flows through two phase windings.

The torque of the synchronous machine is essentially proportional to the current I at constant angular velocity ω, depending on design parameters and voltages, which can be lumped in a constant K, mathematically:

$$M = (K \cdot I / \omega)$$

wherein M is the torque, K a voltage-dependent constant, I current, and ω angular velocity. As can be seen, maintaining the sum of the currents constant, a constant torque will be obtained in all speed ranges.

Transfer switching in the six angular ranges a to f does not require six special transducers with a separately arranged armature position transducer. Three transducer signal switches are sufficient by suitably connecting the switches in accordance with Boolean algebra, and after suitable decoding, in order to obtain up to eight resolved positions. To determine six angular positions, simple contactless transducers can be used, for example optical transducer elements operating in form of a light gate, for example of forked construction.

FIG. 2 illustrates a segmental disk 8 of a rotor position transducer for a six-pole synchronous machine. Three projecting segments 9, 10, 11 are placed at the circumference thereof, each spanning an angle of 60°, and separated from each other by an angle of 60°. The segments, upon rotation of the shaft 12 of the motor, fit between three light gates 13, 14, 15 which are located at a fixed position, for example on the frame of the machine, at angular distances of 20° from each other, around the circumference of the disk. Over an angular range of 120°, and using three pole pairs, corresponding to an angle of 360°-el, six different signal combinations will be obtained—see FIG. 3.

Various other types of transducers may be used, for example Hall transducers, other types of galvanomagnetic transducers, inductive, capacitive, or any types of transducer so long as their switching speed is sufficiently rapid at maximum speed of the synchronous motor.

The circuit diagram for a three-phase synchronous machine 17 with a permanent magnet field is shown in FIG. 4. Shaft 18 corresponds to shaft 12, FIG. 2, and is connected to a rotor position transducer 19 as well as to the tacho generator 20 which is connected electrically to a comparator 21. Comparator 21 receives a speed command signal from a speed command input 22 to generate a speed deviation signal 22' which is applied to a speed control circuit 23. The speed control circuit can be of any well known and suitable construction, providing an output signal furnishing direction and magnitude information in dependence on deviation of actual speed, as sensed by the tachometer 20 from commanded speed as applied to input 22 of comparator 21.

The output signal, typically an output voltage, from the speed control circuit 23 will be representative of a commanded current which is applied to a current distribution stage 16 in order to be there connected to respective ones of first terminals of three three-position electronic transfer switches 24, 25, 26, and further connected to an inverter 27. The inverted command current is applied from the output of the inverter 27 to a second terminal of the three-position transfer switches 24, 25, 26. The third terminal of the three-position switches 24, 25, 26 is connected to ground, chassis, reference or zone potential.

The three signal voltages of the respective transducers of the rotor position transducer 19 are connected to a decoding stage 28 which generates the control signals for the three transfer switches 24, 25, 26. Transfer switching is so carried out that the three command currents are selected which correspond to the currents 4, 5, 6, 7 illustrated in FIG. 1 through the respective phase windings. These commanded current values 29 are then applied to three current comparators 30 to control actual current flow, for comparison in comparators 30 with actual current signals 31 derived from actual current transducers 32, such as ammeters which provide a signal output, and which, for example, may consist of three galvanically isolated current transducers connected in the connection lines to the respective phase windings L1, L2, L3. The output signals from the current comparators 30 are applied to three current controllers 33 which actually provide the currents for the phase windings L1, L2, L3 of the synchronous machine, deriving their own operating currents from an operating source (not shown) and connected to the controllers 33 through supply lines 34.

Figure 5:
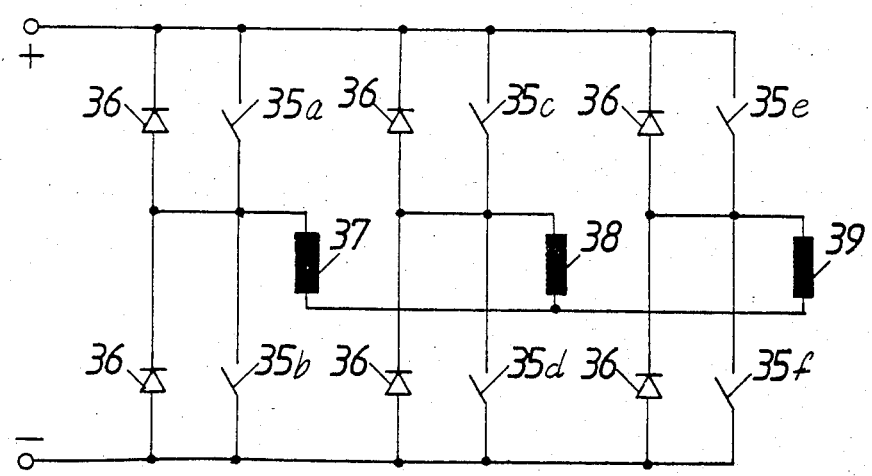
FIG. 5 is a schematic diagram of a three-phase bridge network for four-quadrant control.

The comparators 30 and the current controllers 33 can be constructed as self-clocking four-quadrant units; a suitable construction is shown in German Disclosure Document DE-OS No. 31 19 161, which is particularly desirable since it shows a circuit with low switching losses. For a required torque, the currents in all three phase windings will be constant within all rotary positions and speeds, see FIG. 1, and, except for the direction of current flow, will have the same magnitude. As a consequence of these conditions, the four-quadrant elements can be constructed in substantially simpler form, can be easily controlled and/or combined. Referring to FIG. 5: An inverter circuit, receiving a direct current input in a three-phase bridge network may be used as a four-quadrant supply source. The four-quadrant unit of FIG. 5 has six rectifier switches 35, such as, for example, thyristors or the like, to which free-wheeling parallel diodes 36 are connected; the rectifier switches 35, typically semiconductor rectifier switches, are so controlled and switched that the phase windings 37, 38, 39 receive the required currents. Control of the switches can be obtained by self-oscillating or self-pulsing circuits. To reduce switching losses upon turn-ON and turn-OFF, it is possible to control only one of the switches 35 at any one time for current flow and to utilize the other switches to control current distribution and direction of current flow through the respective windings, as illustrated in the diagram of FIG. 1. Turn-ON and turn-OFF circuits for semiconductor switches are well known, and any suitable connection and disconnection control circuitry may be used.

The selection of the number of poles and phases depends essentially on the design requirements of the application for the servo drive. Four phases may be used in which, for example, two phase windings at any one time have current flow therethrough. Six phases may be used which, in addition to the phase current shown in FIG. 1 require, for three further phase windings, switching of further phase currents which are shifted, each, by 60°-el with respect to the currents shown in FIG. 1 for the currents there shown for the windings L1, L2, L3. The respective separate additional currents flow during the same angular ranges, but in opposite direction. For example, if the first phase is controlled as winding L1—FIG. 1, then the fourth phase will carry in the same angular range an equal current, flowing in opposite direction. A current will flow through the second phase winding in opposite direction to that illustrated with respect to winding L3. The third phase winding will carry a current corresponding to the current shown with respect to winding L2, and the fifth phase winding will have the current corresponding to winding L3 of FIG. 1. The sixth phase then will have a current flowing in the direction opposite the current illustrated with respect to winding L2 in the third phase winding.

The rotor position transducer 19, the decoding stage 22, and the current command and distribution stage 16 can be constructed in similar manner to the one described; the additional phase windings merely require current command values 29 of inverted polarity, derived from the distribution stage 15. A second four-quadrant distribution unit in accordance with FIG. 5 may be used, similarly constructed, in which, with the same command signal for the respective switches 35, corresponding semiconductor switches of the second four-quadrant unit can be controlled. For the same torque, then, lower currents will be required, which is particularly desirable in high-power servo motors.

Figure 6:
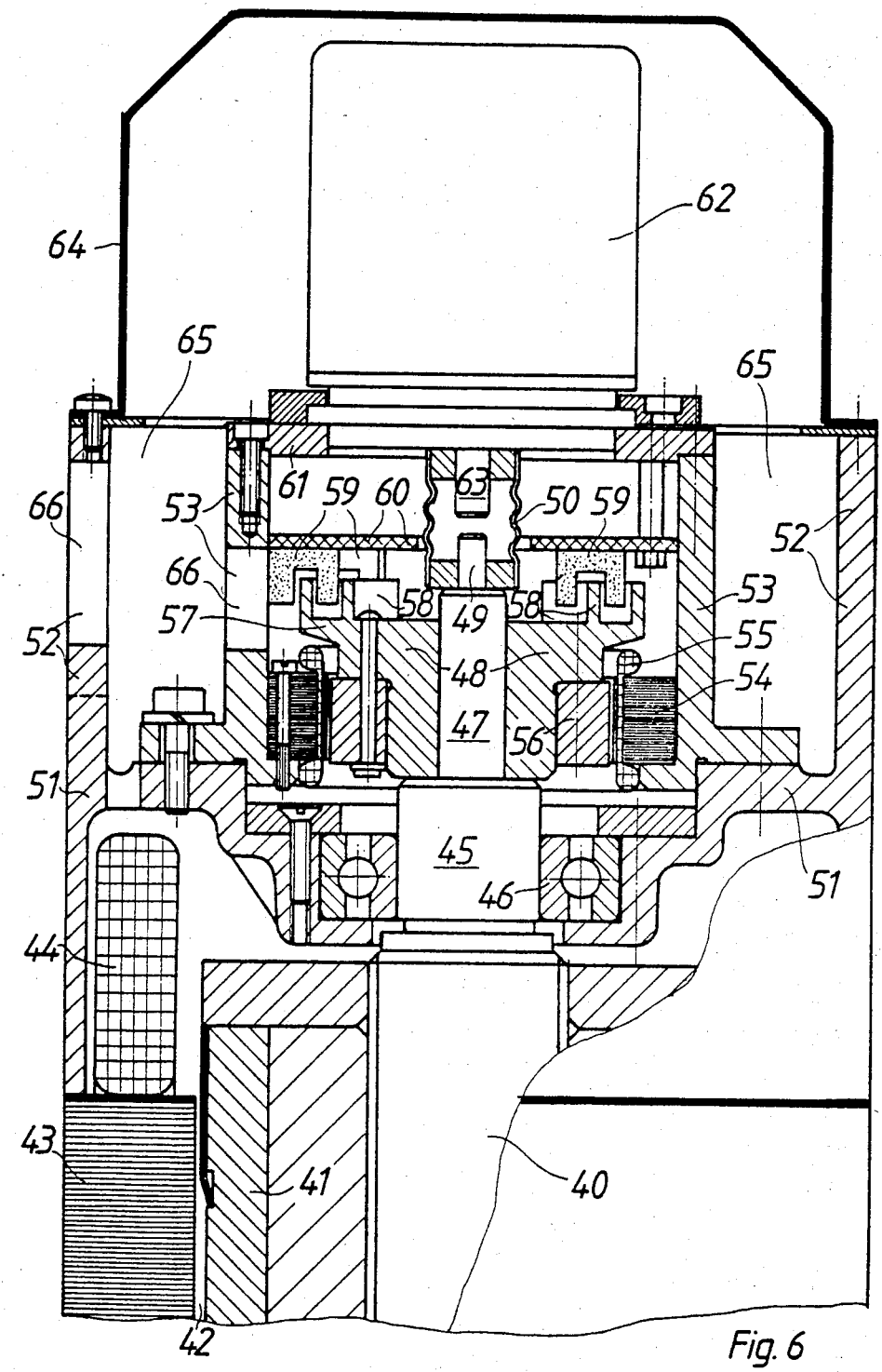
FIG. 6 is an axial schematic sectional view through a portion of a three-phase synchronous dynamo electric machine illustrating the components material for an understanding of the present invention.

The construction of the servo motor is shown in FIG. 6, which illustrates the end portion of the motor remote from the drive shaft connection end. The rotor shaft 40, corresponding to shafts 12, 19 of FIGS. 2, 4, has permanent magnets 41 secured thereto, positioned at an inclination with respect to the axis of rotation of the shaft 40, in order to form skewed magnetic poles. The stator 43, formed of laminated stacks, is spaced by air gap 42 from the rotor 41, and formed with a single slot winding 44. The trailing end of the shaft 40 is stepped down in diameter by three steps. The first shaft step 45 carries bearing 46. The second shaft step 47 carries the rotor position transducer element 48. The third shaft step 49 is connected to a bellows coupling 50. The trailing end bell or end structure 51 of the motor, also carrying the stationary race of bearing 46, is formed with a cylindrical extension 52 at the outer circumference to form a cup-shaped extension of the housing defined thereby. The interior of the cup has a further housing element 53 secured to the bearing structure, in which the stator lamination pack 54, stator windings 55, and a permanent magnet rotor 56 of a tacho generator, corresponding to tacho generator 20 (FIG. 4) are located.

The field magnets 56 of the tacho generator are located on the transducer element 48 which is formed with a radially extended portion 57, extending outwardly in dish-shape configuration. The radially extended portion 57 is formed with rearwardly extending circular segments 58, located concentrically with respect to the axis of rotation of shaft 40, which engage between light gates 59. The light gates 59 are shown only schematically and may be of any suitable construction, for example using light guide elements. The terminals thereof, as well as the structure itself, are connected to a support plate 60, for example in form of a printed circuit (PC) board. The PC board 60 also carries further electronic components—not shown in FIG. 6—interconnected via the printed circuit on the PC board, and utilized for signal processing. Housing 53 is closed off towards the back by a flange 61 which carries a position transducer 62, the shaft 63 of which is coupled over the bellows connection 50 to the synchro motor.

The radially extended, dished portion 57, with the circular segments 58 and the optical light gate elements 59 fitting in interdigited relation with respect to the circular segments 58, form the rotor position transducer. The inner circular segments can be used to switch additional light gates for the tacho generator, which may have a different number of poles and/or phases than the synchronous motor. This construction can be desirable if the tacho output signal should be essentially free from variations in voltage, so that uniform operation of the synchronous motor can be controlled even at extremely low speeds.

The position transducer 62 is a high resolution digital element, for example, a resolver, and is used to control the position of the element driven by the servo motor, for example a machine or machine tool component, via a numerical control. If the position transducer is not needed or required, other types of position transducers can be used, for example coupled directly to the machine or machine component being positioned by the servo motor. In that case, the transducer 62 can be uncoupled by release of the bellows coupling 50 and, rather than utilizing the cap 64 covering also transducer 62, a plane, only slightly bulged cover cap can be connected by suitable screws to the housing, thus providing an even more compact construction. The spaces 65 between the extension 52 of the end bearing cap or bell, and the substantially smaller housing 53 for the tacho generator and the position transducer 58/59 can be used as connecting space for the various connecting cables or lines to be carried out of the motor through the opening 66.

Various changes and modifications may be made within the scope of the inventive concept.

The switches 35 (FIG. 5) can be directly controlled from the three-position transfer switches 24, 25, 26 (FIG. 4). The power supply connections + and − of FIG. 5 then will correspond to the power input terminals 34, and a suitable ground terminal, FIG. 4; and the switches 35, for example gate-controlled thyristors with suitable turn-off circuits or triacs, will be controlled to connect the respectively commanded current, as determined by the current comparators 30. Let it be assumed that the decoder 28 has placed the switches 24, 25, 26 of unit 16 in the position shown. In that position, switch 35a (FIG. 5) will permit current to flow through coil 37, steering the current in reverse flow direction through coil 38 and closed switch 35d, which is commanded to be closed through the inverter 27. Switches 35e and 35f will both be open, which corresponds to the condition of no current flow—neutral connection of switch 26—through coil 39. This will be the condition of period a—see FIG. 1—in which coils 37, 38, 39 correspond to windings L1, L2, L3. As can readily be seen, during the next period b of FIG. 1, switch 35a will remain closed, and current flow will be transferred through coil 39 from coil 38, upon closing of switch 35f which, in the diagram, would correspond to moving switch 26 of the intermediate terminal connected to inverter 27 and switch 25 to the off or ground terminal, leaving switch 24 undisturbed. The remaining switching cycles are self-evident. It should be noted that the total current flow, at all times, will be the same, and constant, the switching unit of FIG. 5 merely steering the current to the appropriate coils or windings. Individual current control through the coils 37, 38, 39 of FIG. 5 has not been shown, and a single current control, for example from a representative coil or under separate command can be used, controlling the energy input at the + and − terminals of FIG. 5.

We claim:

1. In a power servo system, particularly for a numerically controlled machine tool, a fast-acting servo drive system providing rated torque at any speed from speed zero having a multiphase synchronous motor including a magnetic rotor (17), a stator (43) having a plurality of armature phase windings (L1, L2, L3), current level and switching means (33, 35, 36, 37) controlling current flow through said windings;

rotor position sensing means (8, 15; 19) coupled to the rotor and providing rotor position output signals;

and switching control means connected to and controlled by the rotor position output signals and controlling operation of the current level and switching means to provide switching in four-quadrant mode by the current level switching means, wherein means are provided for generating an induced counter electromotive force (EMF) of essentially trapezoidal wave shape having rising and falling portions, connected by a flat or horizontal wave-shape portion comprising a plurality of armature core elements (43) in which the armature phase windings are inserted;

a plurality of field core elements (41) on the rotor (17) and providing a magnetic field, at least one of the armature core elements and the field core elements being skewed or inclined, the angle of skewing or inclination of the at least one of of the core elements and the armature pole coverage angles of the magnet core elements being relatively so positioned that said essentially trapezoidal wave shape of the induced electromotive force is obtained, wherein the switching control means are connected to control said current level and said switching means to supply current (4, 5, 6, 7) to the phase windings under control of the rotor positioning means (19) in pulses of essentially square wave shape occurring only during the time of occurrence of the flat or horizontal portion of the trapezoidal counter electromotive force (EMF) voltages and extending, in time, essentially for the duration of occurrence of said flat or horizontal wave portion;

wherein the current level and switching means are controlling the current flow, in pulses (4, 7), through the phase windings to be of essentially constant value for the entire duration of said pulses at any rotary or angular position of the rotor; and wherein the current level and switching means are additionally controlling and switching current flow to the respective current carrying windings such that the sum of the currents flowing in the respective windings is constant.

2. System according to claim 1, wherein the rotor is a permanent magnet field rotor.

3. System according to claim 1, wherein the skewing of the core elements extends over an angular range corresponding to a phase angle range, within which a change in rising or falling direction of voltage of said essentially trapezoidal wave shape induced electromotive force is obtained;

and wherein the armature windings comprise single slot windings (44) having, each, one slot per pole and per phase in a core element of the armature.

4. System according to claim 1, wherein the rotor position sensing means (8–15, 19) provides rotor position signals representative of angular position at which current flow (4–7) through the phase windings begins or terminates.

5. System according to claim 4, wherein the rotor position sensing means comprises a plurality of transducer elements (13, 14, 15) and a decoding unit (28) receiving the outputs from said transducer elements, and providing rotor position output signals controlling the distribution of current flow through the phase windings (L1, L2, L3; 37, 38, 39) of the armature.

6. System according to claim 4, wherein the rotor position sensing means comprises a plurality of sensing elements (13, 14, 15) positioned at predetermined intervals along the circumference of a circle, and providing a predetermined number of output signals representative of predetermined angular positions of the rotor with respect to the respective sensing elements;

and a decoder is provided receiving the output signals from the sensing elements and furnishing, for each phase, three output signal components representative of initiation, duration, and termination of current flow through the respective phase windings.

7. System according to claim 4, further including a current distribution or current steering stage (16) having three-position transfer switches, one each associated with one of the armature phase windings and, in dependence on the respective position of the switches providing:

(a) connection of current flow to a respective winding in a first direction;

(b) connection of current flow through a phase winding in reverse direction;

(c) disconnection of current supply, corresponding to zero current flow.

8. System according to claim 7, further including current power amplifier controllers (33) connected to and controlled by said three-position switches to furnish currents of controlled magnitude to said phase windings.

9. System according to claim 1, wherein the motor has three n phase windings, wherein n=1 or 2, and said trapezoidal wave shape electromotive force in the respective phase windings includes
  (a) voltage rise extending over a phase angle of 60°-el;
  (b) contant voltage over a first angular range of 120°-el;
  (c) voltage drop over 60°-el and reversal of polarity;
  (d) constant negative voltage over a phase angle of a second angular range of 120°-el;
and wherein the currents through the respective phases, at a level corresponding to a predetermined torque requirement, are controlled to flow;
  (a1) in a first direction, during the first angular range of 120°-el;
  (b1) disconnected in the subsequent 60°-el; and
  (c1) in opposite direction during the second 120°-el angular range of rotation of the rotor.

10. System according to claim 1, wherein the motor has a housing;
  the rotor position sensing means is positioned within said housing;
  and wherein a tacho generator (54, 55, 56) is provided, formed as an integral unit with the rotor position sensing means (58, 59, 60);
  the tacho generator comprises a brushless synchronous generator;
  and wherein the rotor position output signals are connected to and control at least one decoding unit (28), and control signal processing and voltage supply of the tacho generator.

11. System according to claim 1, wherein the rotor position sensing means comprises a segmental disk (8) secured to the rotor shaft (12);
  said segmental disk having a plurality of segments (9, 10, 11);
  light gates (13, 14, 15) being positioned in optically coupled relation with said segments;
  a printed circuit board secured within the housing of the motor and supporting said light gate elements to form a compact single unit structure.

12. System according to claim 1, wherein said current switching means comprises a full-wave bridge circuit connected to the respective phase windings and including controlled semiconductor switches (35);
  free-wheeling diodes (36) connected in parallel to the respective semiconductor switches;
  and wherein the switch control means are connected to render conductive only a portion of said semiconductor switches at any one time in a portion of the bridge branches, the remaining semiconductor switches in the remaining bridge branches being connected to steer the respective currents, as connected by said portions of the semiconductors to those of the phase windings which require current supply.

* * * * *